United States Patent
Kobayashi

(10) Patent No.: US 7,987,882 B2
(45) Date of Patent: Aug. 2, 2011

(54) HEAVY-DUTY PNEUMATIC TIRE

(75) Inventor: Kazuomi Kobayashi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 734 days.

(21) Appl. No.: 11/995,855

(22) PCT Filed: May 24, 2006

(86) PCT No.: PCT/JP2006/310360
§ 371 (c)(1),
(2), (4) Date: Feb. 26, 2008

(87) PCT Pub. No.: WO2007/010672
PCT Pub. Date: Jan. 25, 2007

(65) Prior Publication Data
US 2009/0126847 A1  May 21, 2009

(30) Foreign Application Priority Data
Jul. 20, 2005 (JP) .................. 2005-209884

(51) Int. Cl.
*B60C 9/18* (2006.01)
*B60C 9/22* (2006.01)
*B60C 9/28* (2006.01)

(52) U.S. Cl. ......... 152/526; 152/531; 152/535; 152/538

(58) Field of Classification Search .............. 152/526, 152/527, 528, 529, 530, 531, 532, 533, 534, 152/535, 536, 537, 538
See application file for complete search history.

(56) References Cited

U.S. PATENT DOCUMENTS

| | | | | |
|---|---|---|---|---|
| 2,884,040 | A | * 4/1959 | Noel et al. | 152/527 |
| 6,116,311 | A | * 9/2000 | Ueyoko et al. | 152/531 |
| 6,578,611 | B2 | 6/2003 | Nakata | |

FOREIGN PATENT DOCUMENTS

| | | | |
|---|---|---|---|
| JP | 2-53603 | * | 2/1990 |
| JP | 6-32111 | * | 2/1994 |
| JP | 11-170809 A | | 6/1999 |
| JP | 11-278014 A | | 10/1999 |
| JP | 11-348509 A | | 12/1999 |
| JP | 2000-225810 A | | 8/2000 |
| JP | 2001-301418 | | 10/2001 |
| JP | 2001-301420 A | | 10/2001 |
| JP | 2003-136911 A | | 5/2003 |
| JP | 2005-104437 | * | 4/2005 |

OTHER PUBLICATIONS

Japanese Office Action issued in Japanese Application No. 2005-209884 dated May 25, 2010 (with translation) (6 pages).

* cited by examiner

*Primary Examiner* — Justin Fischer
(74) *Attorney, Agent, or Firm* — Sughrue Mion, PLLC

(57) ABSTRACT

A heavy-duty pneumatic tire capable of sufficiently suppressing the amount of strain occurring in side edges of a belt layer is sufficiently suppressed, despite the required increase in width of the narrow belt layers on the inner layer side, so as to effectively prevent separation of the belt layer and, hence, separation of the belt. The tire includes two narrow belt layers (1B, 2B) on the inner layer side, and two wide belt layers (3B, 4B) on the outer layer side, which are larger in width than the narrow belt layers. The narrow belt layers and the wide belt layers are sequentially arranged on the outer circumferential side of a crown region of a radial carcass (5). The innermost narrow belt layer (1B) has side edges that are convex radially outwards.

4 Claims, 10 Drawing Sheets

HEAVY-DUTY PNEUMATIC TIRE

CROSS REFERENCE TO RELATED APPLICATION

This application is a National Stage of International Application No. PCT/W2006/310360 filed on May 24, 2006, claiming priority based on Japanese Patent Application No. 2005-209884, filed Jul. 20, 2005, the contents of all of which are incorporated herein by reference in their entirety.

TECHNICAL FIELD

The present invention relates to a heavy-duty radial tire, which can be suitably used as truck/bus tires, construction vehicle tires, etc., as being inflated under high pneumatic pressure and used under high load conditions. More specifically, the present invention provides a technology that serves to effectively prevent separation of a belt layer comprised of not less than three plies of belt layers, at its side edge positions and thereby improve the durability of the belt.

BACKGROUND ART

With respect to this type of conventional tires, for example, JP2000-225810A (or corresponding U.S. Pat. No. 6,578,611B2) discloses a tire including a main belt wherein two plies of narrow belt layers on the inner layer side and two plies of wide belt layers on an outer layer side, which are wider than the narrow belt layers, are sequentially arranged on the outer periphery of the crown region in a radial carcass to extend along the crown region within a widthwise sectional plane of the tire. In such conventional tires, the belt cords of the narrow belt layers extend in such a direction as to intersect the tire equatorial plane with a relatively small angle. Thus, these narrow belt layers serve to bear the circumferential tension to suppress diametrical growth of the tire, thereby preventing change in the crown shape during rolling of the tire under a loaded condition. Moreover, the provision of relatively narrow belt layers serves to mitigate the strain occurring at the side edges of the belt layers.

On the other hand, as for the wide belt layers, the intersection angle of the belt cords relative to the tire equatorial plane is made larger than that of the belt cords of the narrow belt layers and the belt width is made larger than the width of the narrow belt layers so as to provide an enhanced intra-plane rigidity of the belt, thereby providing excellent kinetic performance, such as turning property of the tire during cornering of the vehicle, straight running stability, etc.

In this instance, for example, it is considered necessary for the belt cords of the two narrow belt layers on the inner layer side to extend in mutually opposite directions relative to the tire equatorial plane so as to intersect each other, in order that the belt tension is borne by the belt cords. Also, it is considered necessary for the belt cords of the two wide belt layers on the outer layer side to similarly intersect each other between the layers, in order that the belt exhibits a high intra-plane rigidity.

Moreover, it is known that if the belt cords of the second layer forming the narrow belt layer and the third layer formed by the wide belt layer, both as counted from the radially inner side, extend in mutually opposite directions relative to the tire equatorial plane so as to intersect each other between the layers, then the belt cords of the innermost narrow belt layer and the wide belt layer as the third layer extend in the same direction, so as to suppress the relative shearing strain between the side edges of the innermost narrow belt layer and the third layer forming the wide belt layer, which are adjacent to each other in the radial direction, thereby preventing concentration of strain at the side edges of the innermost narrow belt layer.

Therefore, with respect to the main belt, it is considered preferable for the belt cords of all the layers to extend with intersection to each other between the adjacent layers, so as to suppress the diametrical growth of the tire and provide high intra-plane and extra-plane rigidities of the belt, thereby dispersing the strain occurring at the side edges of the belt layers.

However, with the conventional tires as explained above, when it is intended to suppress the diametrical growth of the tire by arranging the belt cords of the two narrow belt layers on the inner layer side, since the belt cords of the second narrow belt layer and the third layer formed by the wide belt layer, as seen from the radially inner side, are arranged to intersect each other, it is difficult to sufficiently suppress formation of cracks from the side edges of the two narrow belt layers on the inner layer side, to achieve an intended suppression of the diametrical growth of the tire, and to provide high intra-plane and extra-plane rigidities of the belt.

To cope with such a problem, there has been proposed to suppress formation of cracks from the side edges of the belt layers by applying a coating rubber to the side edges of the belt layers, or selecting the modulus of elasticity of the inter-layer rubber for the neighboring portions of the side edges of the belt layers. However, these proposals are still incapable of sufficiently suppressing growth of cracks from the side edges of the belt layers.

DISCLOSURE OF THE INVENTION

Task to be Solved by the Invention

In operation of tires under a loaded condition, external forces are applied to the toroidal main belt from various directions, including circumferential direction, radial direction and width direction of the belt so as to cause interlayer shearing strain or other strain at the side edges of the belt layers due to displacement of the intersecting cords in the manner of parallelogram. Such strain tend to become large when the belt cords have an small intersection angle relative to the tire equatorial plane and the belt layers have large widths, as in the case of the above-mentioned narrow belt layers on the inner layer side, thereby giving rise to problems of a premature formation of cracks at locations of increased strain in the side edges of the belt layers, and the tendency of an interlayer growth of such cracks.

With respect to the belt layers on the outer layer side in the conventional tire as explained above, it is noted that increase in width of the belt layer effectively preserves the high rigidity of the main belt, and increase in intersection angle of the belt cords relative to the tire equatorial plane effectively serves to the reduction of strain; hence, the required two performances can be realized in a compatible manner.

On the other hand, with respect to the narrow belt layers on the inner layer side in the conventional tire, of which the intersection angle of the belt cords relative to the tire equatorial plane is small, it is inevitable to preserve the width of the belt layers to certain extent in order to suppress diametrical growth of the tire. This is incompatible with the requirement for a reduced width of the narrow belt layers in order to reduce the strain at the side edges of the belt layers. Thus, for example, if priority is given to the strain reduction and the width of the narrow belt layers is thus reduced, then problems are caused in that the diametrical growth of the tire during rolling under a loaded condition cannot be avoided, with inevitable increase in heat generation quantity and wear amount, beside that the so-called "cut separation" tends to occur wherein the tread rubber undergoes separation due to premature growth, along the outer surface of the outermost belt layer, of the cuts occurring in the tread surface, etc.

The present invention has been achieved in order to solve the above-mentioned problems of the prior art. Thus, it is an object of the present invention to provide a heavy-duty pneumatic tire that is capable of sufficiently suppressing the amount of strain occurring in the side edges of the belt layers, despite the required increase in width of the narrow belt layers on the inner layer side, so as to effectively prevent separation of the belt layer and, hence, separation of the belt.

Means for Solving the Task

The inventor conducted thorough investigations on the belt layer comprised of belt cords having a small intersection angle relative to the tire equatorial plane, and found that an increase in the shearing strain occurring at the side edges of the belt layer can be suppressed despite a required width of the belt layer, by paying a particular attention to the structure of the side portion of the belt. Thus, according to the present invention, there is provided a heavy-duty radial tire comprising a radial carcass having a crown region, two plies of narrow belt layers on an inner layer side, and at least one ply of wide belt layer on an outer layer side, which is larger in width than said narrow belt layers, wherein said narrow belt layers and said at least one wide belt layer are sequentially arranged on an outer periphery of said crown region, and are preferably comprised of steel belt cords. In this instance, in a tire posture wherein the tire is mounted on a design rim and inflated with a designated inner pressure, the belt cords of the two narrow belt layers intersect a tire equatorial plane at an intersection angle, which is smaller than that of belt cords of the wide belt layers, and the belt cords of the belt layers extend in directions intersecting each other between adjacent layers, preferably in opposite directions relative to the tire equatorial plane. Also, in the above-mentioned tire posture, the narrow belt layer as the innermost layer has side edges that are convex radially outwards.

It is preferred that the side edges of the innermost narrow belt layer includes projections that are convex toward a radially outer side, each having a maximum projection height (C) defined with reference to the inner peripheral surface of the innermost layer at its intersection with the tire equatorial plane, i.e., measured in the radial direction of the tire from a straight line, which is tangent to the projection on the inner peripheral surface of the narrow belt layer and extends in parallel with the center axis of the tire, wherein the maximum projection height is within a range of:

$$0 < C < 3 \times d_1$$

where $d_1$ is the diameter of the belt cords of the innermost layer.

Here, the side edges of the innermost narrow belt layer refers to the region that is included within a range of 60-95% of the width ($W_1$) of the narrow belt layer on both sides of the tire equatorial plane, and the projection has a peak position that exists such a region.

It is to be noted that the term "design rim" refers to a rim specified in the standards identified below with reference to the tire size, the term "designated inner pressure" refers to the air pressure also specified in the standards identified below with reference to the maximum load capacity, and the term "maximum load capacity" refers to the maximum weight that s permitted to be loaded to the tire. In this instance, air may be replaced by inert gas such as nitrogen gas, etc.

The standards are stipulated by industrial standards applicable to areas where the tires are produced or used, including "Year Book" issued by The Tire and Rim Association, Inc. for the United States, "Standards Manual" issued by The European Tyre and Rim Technical Organization for European countries, and "JATMA Year Book" issued by The Japan Automobiles Tyre Manufacturers Association for Japan.

It is preferred that, in the tire posture wherein the tire is mounted on a design rim and inflated with a designated inner pressure, for example, the narrow belt layers have a width that is within a range of 0.25 to 0.5 times of a tread width (TW), and the intersection angle of the belt cords, preferably steel belt cords, relative to the tire equatorial plane is within a range of 3° to 10°. It is also preferred that, in the same tire posture, the wide belt layer has a width that is within a range of 0.60 to 0.8 times of the tread width (TW), and the intersection angle of the belt cords, preferably steel belt cords, relative to the tire equatorial plane is within a range of 15° to 35°.

It is preferred that the difference in the average width between the wide belt layer and the narrow belt layers is within a range of 0.2 to 0.4 times of the tread width (TW).

Effects of the Invention

The inventor conducted drum tests in order to evaluate the running durability of conventional tires including a main belt as shown in the half-width sectional view of FIG. 10, which is taken in the tire width direction. As a result, it has been clarified that, with respect to two narrow belt layers 52, 53 on the inner layer side, which are arranged on the outer peripheral side of the crown region of a radial carcass 51, there are generated at the side edges of the narrow belt layer 53 on the outer layer side, cracks $C_1$ extending toward the narrow belt layer 52 on its inner layer side, and also cracks $C_2$ extending toward a wide belt layer 54 arranged on the outer layer side adjacent to the narrow belt layer 53 on its outer peripheral side, and growing between the belt layers 53, 54. It has also been clarified that there are generated at the side edges of the innermost belt layer 52, cracks $C_3$ extending toward the narrow belt layer 53 on its outer peripheral side and growing between the belt layers 52, 53. Incidentally, reference numeral 55 denotes the outermost wide belt layer arranged on the outer layer side.

Then, the occurrence situation of interlayer shearing strain, which causes generation of such cracks $C_1$, $C_2$ and $C_3$, has been analyzed by means of strain analysis with finite element method. Such analysis revealed that the interlayer shearing strain can be classified as a first type of interlayer shearing strain that occurs over the entire width of the belt due to a bending deformation of the belt in a widthwise-sectional plane of the tire, which, in turn, occurs as a result of the compressive deformation of the ground contact portion of the tread during the running of the tire under a loaded condition, and as a second type of interlayer shearing strain due to a circumferential tensile force generated at the side portion of the belt when the tire is loaded or when lateral forces are applied to the tread surface.

Therefore, it can be concluded that the cracks $C_1$, $C_2$ and $C_3$ from the side edges of the belt layers 52, 53 as explained above are generated as a result of superimposition of such two types of interlayer shearing strains, the mode of which can be exemplarily illustrated by a graph as shown in FIG. 11. It is to be noted that the shearing strain (%) for the ordinate of this graph refers to the strain rate between the belt layers that undergo dislocation in the circumferential direction.

It can be understood from FIG. 11 that the strain between the narrow belt layers 52, 53 is noticeably high at the side edges as a result of superimposition of the shearing strain due to the bending and the shearing strain due to tension. On the other hand, the strain between the belt layers 53, 54 is high at the side edges of the narrow belt layers 52, 53 similar to the strain therebetween, but gradually decreases from the side edge of the narrow belt layer 53 toward the outer side in the width direction of the tire.

In view of the above, in order to suppress occurrence of cracks $C_1$, $C_2$ and $C_3$, it is effective to reduce at least one of the shearing strain due to the bending and the shearing strain due to tension.

Here, in order to reduce the shearing strain due to the bending deformation, it is effective to make large the difference in circumferential elongation between the neighboring belt layers so that the bending deformation upon stepping-in and kicking-out of the tread surface is absorbed by the elongation of the belt layers, per se, instead of elongation of the interlayer rubber of the belt layers. It is also important to take a large distance between the belt layers on the inner layer side and the belt layers on the outer layer side. Thus, in order to suppress the strain at the side edges of the second-innermost narrow belt layer subjected to severe concentration of the shearing strain, for example, it is effective for the wide belt layer as the third belt layer, and also for the wide belt layer as the fourth belt layer, if any, to be convex radially outwards, at locations corresponding to the side edges of the narrow belt layer as the second belt layer. However, the resultant increase in the interlayer distance gives rise to problems of increased total thickness of the tread portion and increased heat generation quantity during the rolling of the tire, thereby degrading the thermal durability of the tire.

Thus, according to the present invention, priority is given to the reduction of the interlayer shearing strain due to the bending deformation of the belt by making large the difference in circumferential elongation of the neighboring belt layers, and the side edges of the innermost belt layer are provided with projections that are convex radially outwards, with reference to the intersection position of that belt layer relative to the tire equatorial plane.

With the belt structure of the tire according to the present invention, generally, the two narrow belt layers on the inner layer side having a small intersection angle of the belt cords relative to the tire equatorial plane undergo a small elongation in the circumferential direction, whereas the two wide belt layers on the outer layer side of these narrow belt layers having a small intersection angle of the belt cords relative to the tire equatorial plane undergo a large elongation in the circumferential direction. Therefore, when the belt is subjected to a bending deformation radially inwards, as seen in the widthwise-section of the belt, an optimum selection of the position of the neutral axis of the bending due to the provision of the above-mentioned projections makes it possible to locate the entirety of the center region of the belt on the circumferential compression side, to locate the side portions of the inner layer-side narrow belt layers on the circumferential tension side, and to locate the wide regions in the side portions of the outer layer-side wide belt layers on the circumferential compression side. By this, the side edges and their neighboring regions of the narrow belt layer as the second innermost belt layer are located on the circumferential tension side, while the wide belt layer as the third belt layer is located on the circumferential tension side, making it possible to preserve a large difference in elongation and thereby effectively reduce the shearing strain due to the circumferential bending.

This is illustrated in the graph of FIG. 1, from which it can be understood that due to the provision of the projections for the side edges of the innermost narrow belt layer, the interlayer shearing strain occurring between the innermost narrow belt layer and the second narrow belt layer, and also between the second narrow belt layer and the third wide belt layer, due to the bending deformation gradually increases in the center region of the belt toward the tire equatorial plane, and gradually decreases toward the side edges, both as opposed to the case shown in FIG. 11.

On the contrary, due to the provision of the projections for the side edges of the innermost narrow belt layer, the interlayer shearing strain due to tension occurs at the side edges of each belt layer with a degree similar to the case shown in FIG. 11, though the above-mentioned reduction of the interlayer shearing strain due to the bending deformation makes it possible to effectively reduce the total shearing strain at the side edges of the belt layer as a whole, to advantageously suppress formation of cracks at the side edges of the narrow belt layers on the inner layer side.

In order to realize such a reduction of the interlayer shearing strain due to the bending deformation, it is required that the projections of the innermost narrow belt layer, in particular the peaks thereof, are located in the side edges of that narrow belt layer, i.e., in the region included within a range of 60-95% of the width ($W_1$) of the narrow belt layer on both sides of the tire equatorial plane.

In this way, it is possible to selectively reduce the shearing strain between the side edges of the innermost belt layer and the side edges of the second belt layer. If, however, the projections are located in a region below 60%, the shearing strain tends to increase even though the shearing strain due to the bending between both belt layers in the regions adjacent to the center portion can be reduced. On the other hand, if the projections are located in a region above 95%, the peaks of the projections are situated on the outer side in the width direction of the belt, resulting in a poor effectiveness of the provision of the projections.

In this instance, it is preferred that the maximum projection height (C) of the projections at the side edges of the innermost narrow belt layer, which is defined with reference to the inner peripheral surface of the innermost layer at its intersection with the tire equatorial plane, i.e., measured in the radial direction of the tire from a straight line, which is tangent to the projection on the inner peripheral surface of the narrow belt layer and extends in parallel with the center axis of the tire, is within a range of:

$$0 < C < 3 \times d_1$$

where $d_1$ is a diameter of the belt cords of said innermost layer.

In other words, when the projections are not provided at the side edges of the innermost narrow belt layer, the interlayer shearing strain due to the bending deformation cannot be reduced, while if the maximum projection height of the projections is not lower than $3d_1$, the interlayer cracks formed at the center portion of the belt width exhibit development with a degree that is too large.

In the heavy-duty pneumatic tire as explained above, if the width of the innermost and second innermost narrow belt layers is within a range of 0.25 to 0.5 times of a tread width (TW), the narrow belt layers exhibit the function of diametrical growth suppression, and yet effectively prevent formation of cracks from the side edges of the belt layers.

Namely, if the width is less than 0.25 times, the above-mentioned problems associated with heat generation quantity and wear amount are likely caused due to the diametrical growth of the tire, while if it is above 0.5 times, in addition to the above-mentioned increase in the shearing strain at the side edges of the belt layers, further problems are likely caused such as degradation in vibration and riding comfort.

In this instance, it is preferred that the intersection angle of the belt cords in the narrow belt layers relative to the tire equatorial plane is within a range of 3° to 10°, in order for the belt layers to exhibit a high resistance to circumferential tension and thereby improve the durability of the belt. If the intersection angle is less than 3°, the elongation of the belt layers in the circumferential direction is almost out of expectation, with the result that non-uniform wear is likely caused due to an excessive difference in resistance to the circumferential tension between the center region and side regions, and an excessive ground contact length at the side regions of the tread. On the other hand, if the intersection angle is more than 10°, the resistance to circumferential tension of the narrow belt layers and, hence, diametrical growth suppression force becomes poor, thereby increasing the heat generation quantity and wear amount, with an enhanced tendency of cut separation.

It is also preferred that the width of at least one wide belt layer is within a range of 0.60 to 0.8 times of the tread width (TW), in order to effectively suppress the strain at the side edges of the belt layers, and yet preserve an excellent anti-wear resistance to the cornering power. If the width of the wide belt layer is less than 0.6 times, the diametrical growth suppression function and anti-wear resistance at the tread portion are inevitable degraded, while if it is more than 0.8 times, separation failures tend to occur at the side edges of the belt layers.

In this instance, it is preferred that the intersection angle of the belt cords of the wide belt layers relative to the tire equatorial plane is within a range of 15° to 35°, in order to improve the anti-wear property to the cornering power.

It is also preferred that the average width of the wide belt layers differs from the average width of the narrow belt layers by an amount that is within a range of 0.2 to 0.4 times of the tread width (TW), in order to provide well-balanced suppression of the interlayer strain and anti-wear property in a highly sophisticated manner.

BRIEF DESCRIPTION OF THE DRAWINGS

The present invention will be describe below in further detail, with reference to the accompanying drawings, wherein.

REFERENCE SYMBOLS

Figure 1:
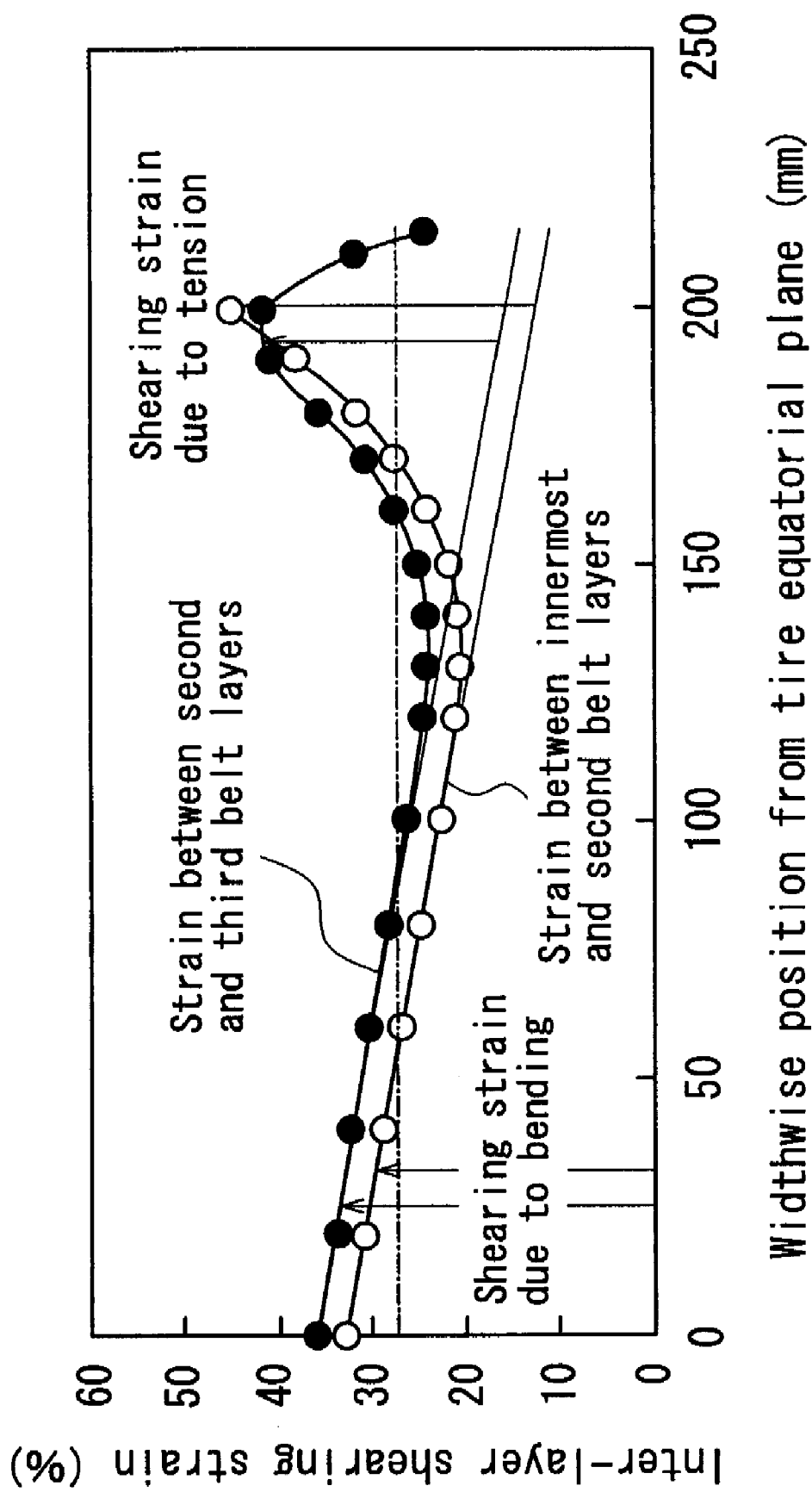
FIG. 1 is a graph showing advantageous effects brought about by the tire according to the present invention.

1 . . . Tread portion
2 . . . Sidewall portion
3 . . . Bead portion
4 . . . Bead core
5 . . . Radial carcass
6 . . . Belt
7, 10 . . . Projections
9 . . . Neutral axis
$W_1$ . . . Width of the innermost narrow belt layer
X . . . Tire equatorial plane
1B, 2B, 3B, 4B . . . Belt layers
1 . . . Straight line
C . . . Maximum projection height
$\theta_1, \theta_2, \theta_3, \theta_4$ . . . Belt cord angles relative to tire equatorial plane
C12, C23, CC12, CC23 . . . Crack growth lengths

BEST MODE FOR CARRYING OUT THE INVENTION

Figure 2:
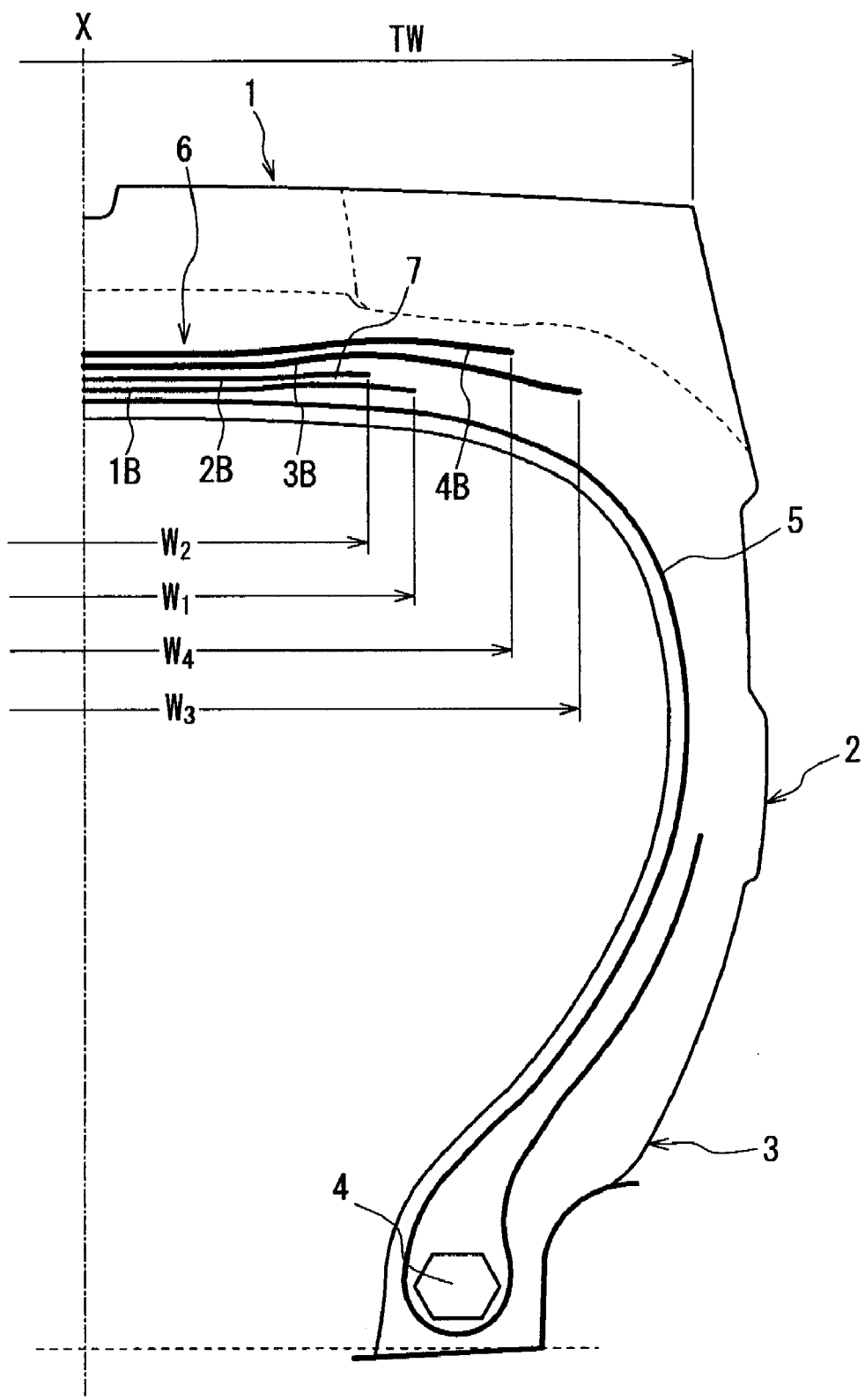
FIG. 2 is a widthwise-sectional view showing the right half of the tire according to one embodiment of the present invention.

The widthwise-sectional view of FIG. 2 shows the right half of the tire according to one embodiment of the present invention, which is under a posture as being mounted on a design rim and inflated with a designated inner pressure. Reference numeral 1 denotes a tread portion, 2 denotes a sidewall portion extending continuously from a side portion of the tread portion 1 radially inwards, and 3 denotes a bead portion that extends continuously on the inner peripheral side of the sidewall portion 2.

A radial carcass 5 comprised of at least one carcass ply is provided, which extends in a toroidal manner between opposite bead cores 4 at the bead portions on both sides, and which serves to reinforce the tread portion 1, sidewall portions 2 and bead portions 3. The radial carcass 5 has side portions that are turned-up around the relevant bead cores 4 radially outwards.

The radial carcass 5 includes a crown region having an outer peripheral side, on which is arranged a belt layer comprised of at least three layers, i.e., a belt 6 comprised of four belt layers in the illustrated embodiment. Among these belt layers, the innermost belt layer and a second innermost belt layer adjacent to, and arranged on the outer peripheral side of the innermost belt layer both constitute narrow belt layers 1B, 2B on the inner layer side, and a third belt layer and the outermost belt layer arranged on the outer peripheral side of the belt layers 1B, 2B both constitute wide belt layers 3B, 4B on the outer layer side.

Figure 3:
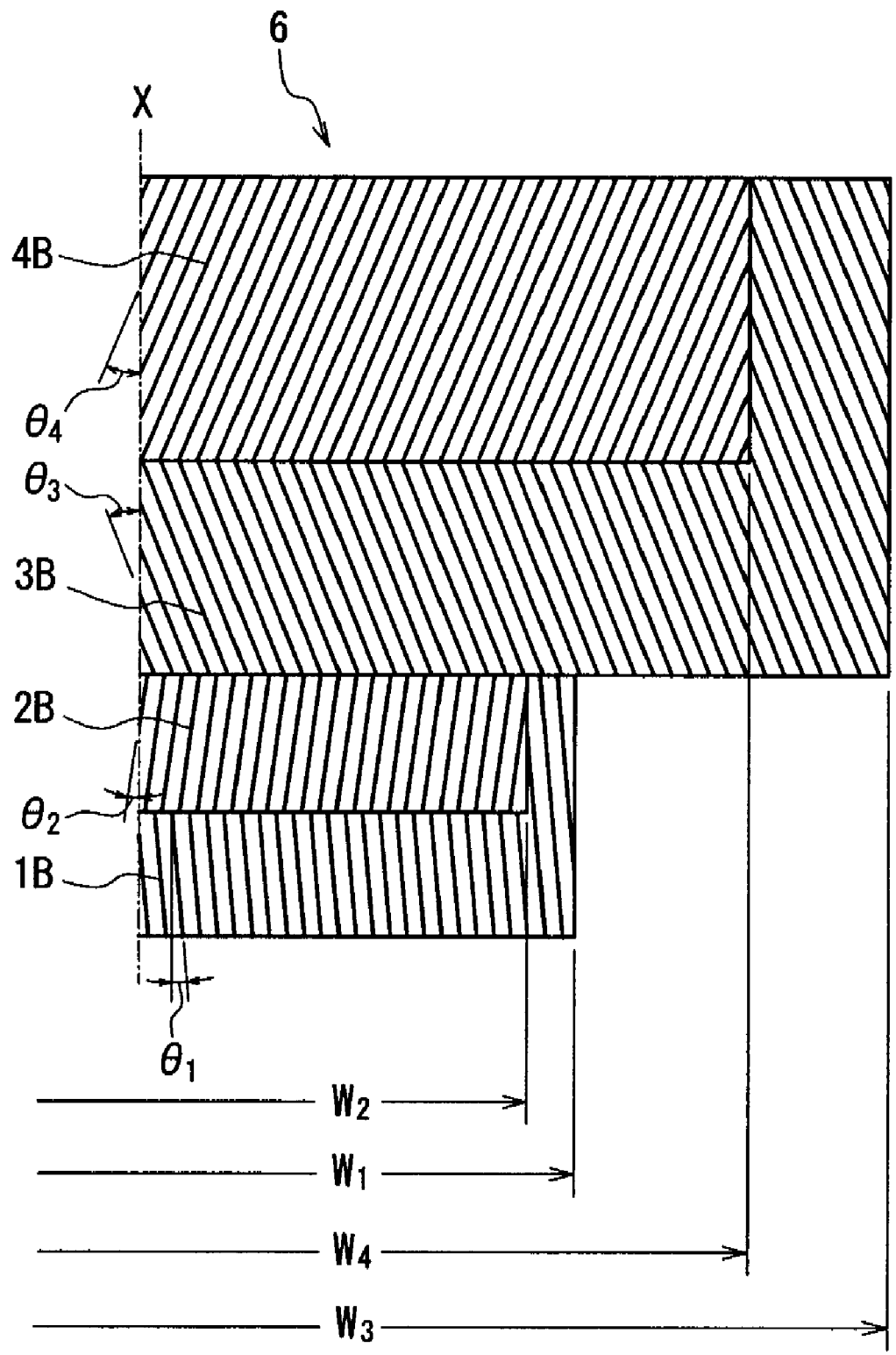
FIG. 3 is a sight-through plane view showing the right half of the belt.

As shown in the sight-through plane view of the belt illustrated in FIG. 3, among the respective belt layers, the innermost narrow belt layer 1B has a width $W_1$ as measured in the width direction of the tire, which is larger than the width $W_2$ of the narrow belt layer 2B as the second layer. The wide belt layer 3B as the third belt layer has a width $W_3$ that is larger than those of the narrow belt layers 1B, 2B. The outermost wide belt layer 4B has a width $W_4$ that is larger than that of the innermost narrow belt layer 1B, but smaller than that of the third belt layer 3B.

It is preferred that the widths $W_1$, $W_2$ of the narrow belt layers 1B, 2B are within a range of 0.25 to 0.5 times of the tread width TW, and the widths $W_3$, $W_4$ of the wide belt layers 3B, 4B are within a range of 0.6 to 0.8 times of the tread width TW.

It is also preferred that the difference between the average width of the wide belt layers 3B, 4B and the average width of the narrow belt layers 1B, 2B is within a range of 0.2 to 0.4 times of the tread width TW.

The narrow belt layers 1B, 2B include belt cords comprised of low-elongation material such as steel, aramid fibers, etc., having an intersection angle $\theta_1$, $\theta_2$, relative to the tire equatorial plane X, which is within a range of 3° to 10°. Similarly, the belt cords of the wide belt layers 3B, 4B have an intersection angle $\theta_3$, $\theta_4$, relative to the tire equatorial plane X, which is larger than the intersection angle $\theta_1$, $\theta_2$, and which is within a range of 15° to 35°. It is preferred that, as shown in FIG. 3, these belt cords extend in opposite directions relative to the tire equatorial plane, between adjacent belt layers.

Figure 6:
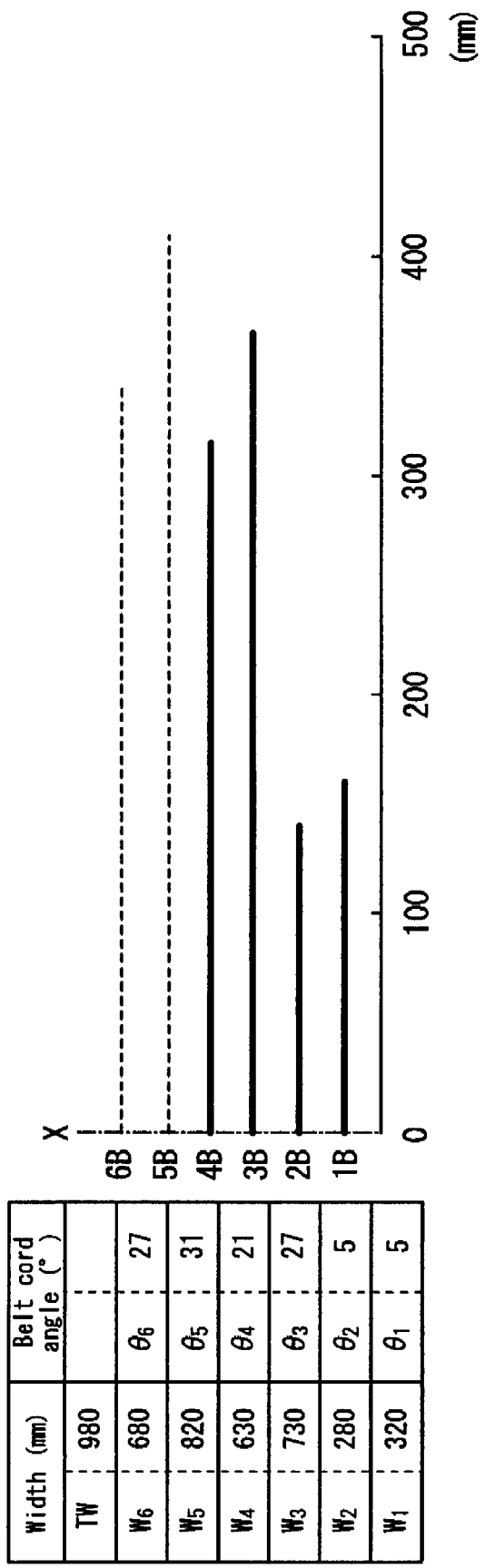
FIG. 6 schematically shows the basic laminated structure of the belt layer in the test tires.
Figure 7:
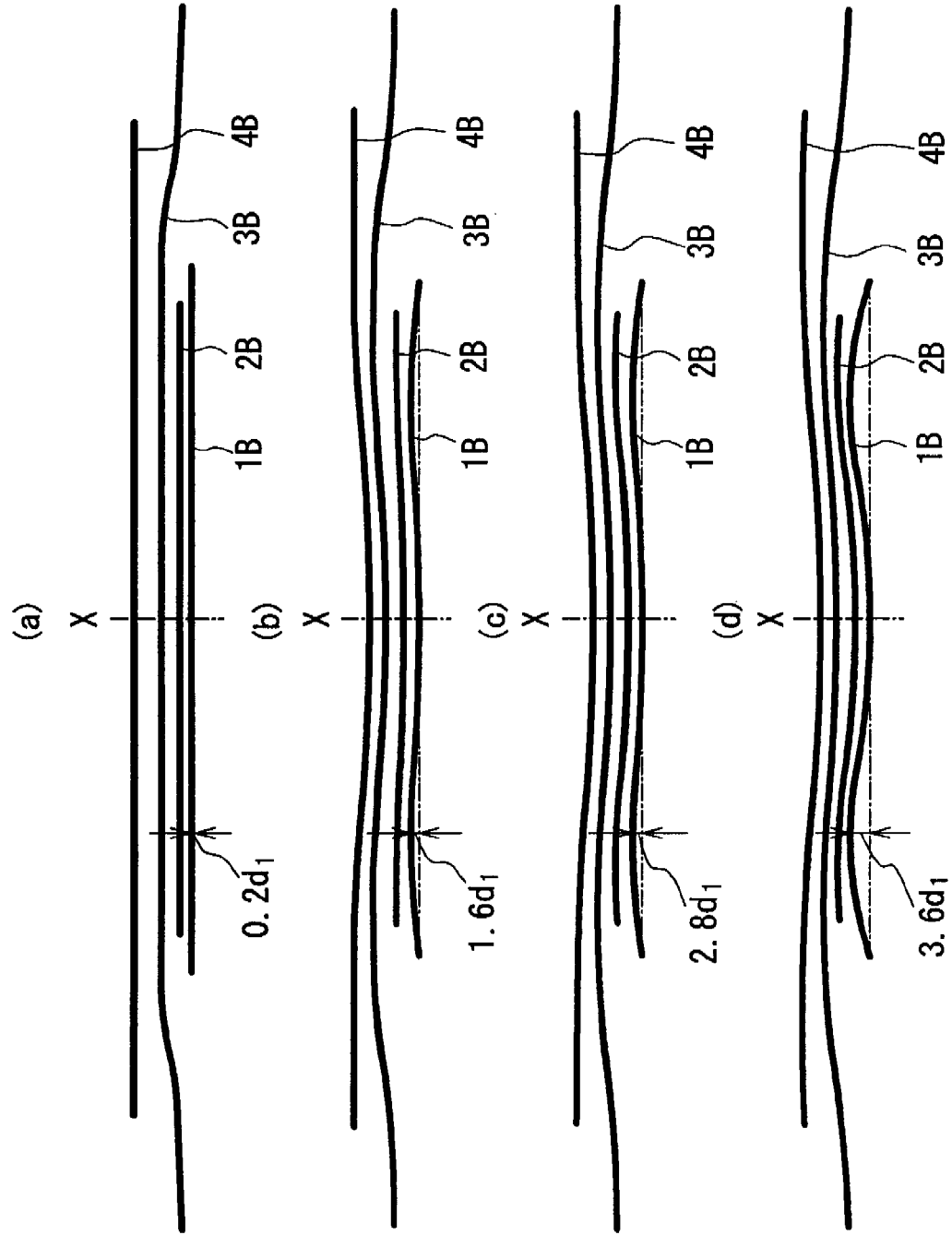
FIGS. 7(a) to 7(d) schematically show the belt structure of the test tire as used in Example 1.

In the above-mentioned arrangement of the belt layers, as shown in enlarged view of the belt 6 illustrated in FIG. 6, the side edge of the innermost narrow belt layer 1B, i.e., the region included within a range of 60-95% of the width $W_1$ of the narrow belt layer 1B on both sides of the tire equatorial plane X, is partly or entirely formed as a projection that is convex radially outwards, by interposition of a rubber material, appropriate shaping of the tread rubber, etc, for example. The projection 7 has the maximum projection height C on the inner peripheral surface, which is measured at the intersection of the innermost narrow belt layer 1B with the tire equatorial plane X, in the radial direction of the tire from a straight line 1, which is tangent to the inner peripheral surface of the narrow belt layer 1B and extends in parallel with the center axis of the tire, wherein the maximum projection height C is within a range of:

$$0 < C < 3 \times d_1$$

where $d_1$ is the diameter of the belt cords of the narrow belt layer 1B.

Figure 4:
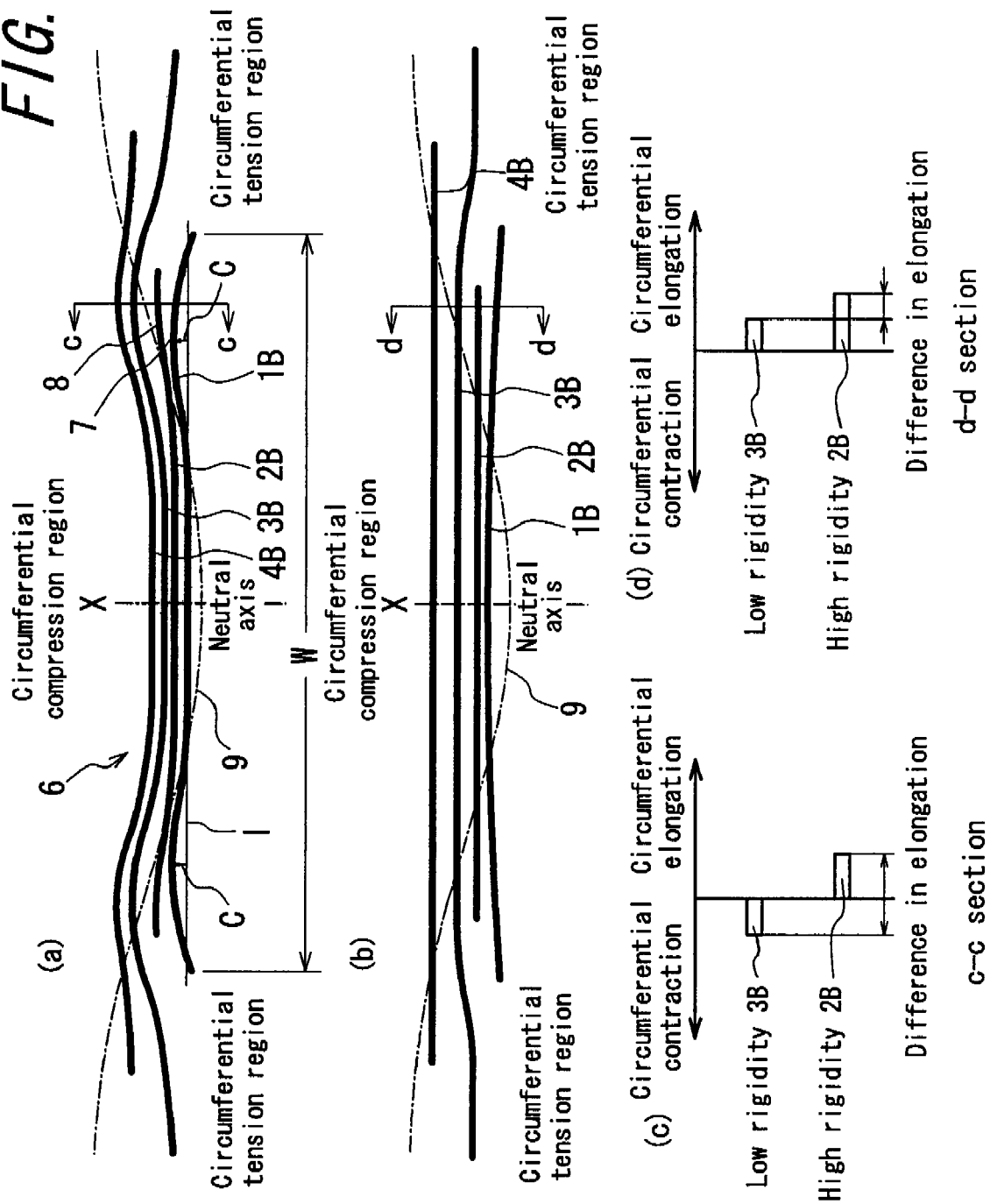
FIGS. 4(a) to 4(d) schematic show examples of the projection provided for the innermost narrow belt layer.

It is to be noted that, in FIG. 4(a), due to the provision of the projection 7 for the innermost narrow belt layer 1B, the second narrow belt layer 2B also is formed with a projection 8 that is convex radially outwards, though formation of such a projection 8 is not a requirement for the present invention.

With the belt 6 constructed as described above, when the belt 6 undergoes bending deformation due to the compressive deformation of the ground contact region in the tread portion by the rolling of a loaded tire, the neutral axis 9 of the bending extends as shown by imaginary line in FIG. 4(a), such that the side portions of the wide belt layer 3B extend, over a wider range, on the circumferential compression side, as compared to the case wherein the innermost belt layer is not provided with the projections, i.e., as compared to the conventional extension of the neutral axis 9 as shown in FIG. 4(b).

Thus, when observed in cross-section at a location adjacent to the side edge of the narrow belt layer 2B as the second layer, e.g., in the cross-section at C-C position in FIG. 4(a), the circumferential elongation/contraction of the narrow belt layer 2B having a high circumferential rigidity, and the wide belt layer 3B having a low rigidity takes place as schematically shown in FIG. 4(c), such that the wide belt layer 3B is subjected to a circumferential compression deformation while the narrow belt layer 2B is subjected to a circumferential elongation deformation. In this instance, the difference in elongation between the narrow belt layer 2B and the wide belt layer 3B is far greater as compared to the case of FIG. 4(d), which shows the mode of elongation/contraction at a sectional position similar to that of FIG. 4(b). This means that the interlayer shearing strain between the side edges of the narrow belt layer 2B and the wide belt layer 3B can be effectively reduced.

With reference to FIG. 1, it can be understood that the interlayer shearing strain due to tensile force between the side edges of the innermost narrow belt layer 1B and the second narrow belt layer 2B, per se, is substantially unreduced.

Figure 5:
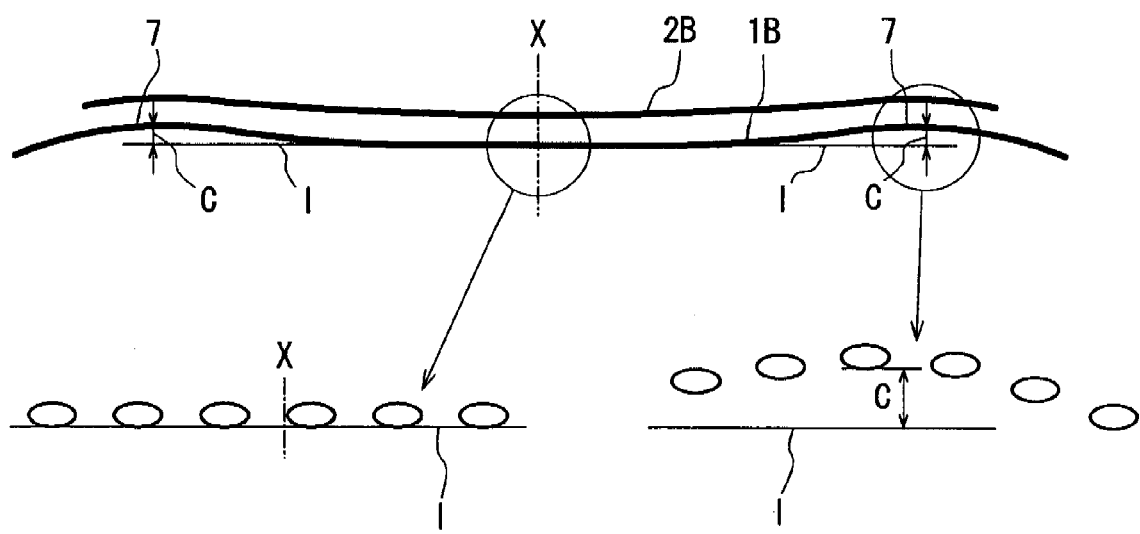
FIG. 5 schematically shows the mode of measurement of the maximum projection height.

It is to be noted that the measurement of the maximum projection height C of the projection 7 provided for the side edges of the innermost narrow belt layer 1B can be performed, as shown in FIG. 5, by measuring the distance between the inner peripheral edge of the belt cord situated on the radially outermost side and a straight line 1, which passes the average position of the inner peripheral edges of six belt cords, i.e., three belt cords on each side of the tire equatorial plane X, at the intersection of the narrow belt layer 1B and the equatorial plane X, and which extends in parallel with the center axis of the tire up to a location adjacent to the side edge of the narrow belt layer 1B.

Example 1

Figure 8:
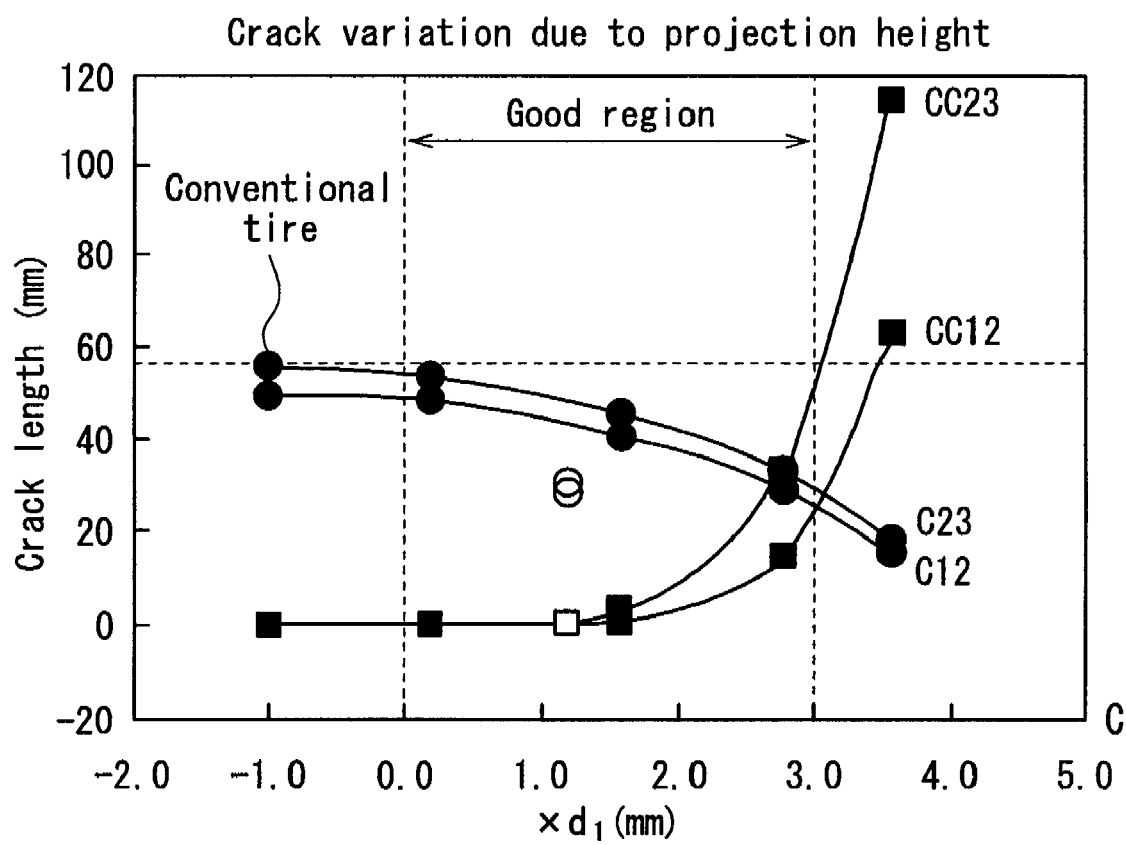
FIG. 8 shows the results of measurement with respect to the crack growth length in Example 1.

There have been prepared test tires having a size of 4000R57, and six-layered belt structure and tread width as shown in FIG. 6, wherein the maximum projection height positions of the projections are situated at 78% positions on both sides of the tire equatorial plane X. The maximum projection height C of these projections were varied as shown in FIGS. 7(a) to 7(d) to evaluate the durability of the belt, and the results as shown in FIG. 8 were obtained. Incidentally, the diameter of the belt cords of the innermost belt layer was 2.5 mm.

Here, the evaluation was performed by mounting the test tires to a rim having a rim width of 29 inches, setting the inflation inner pressure as 700 Pa, and subjecting the test tires under loaded condition to rolling on a test drum having a diameter of 5.0 m, under the temperature of 30° C. and at a speed of 10 km/h. In this instance, the load weight was 150% of the weight as prescribed by TRA standards, and the lateral force applied to the tread surface was set to 0.1 G. After 240 hours rolling of the test tires, the tires were cut each at four circumferential positions in the width direction, to measure the growth lengths of the cracks occurring at the side edges, etc., of the belt layers.

Figure 10:
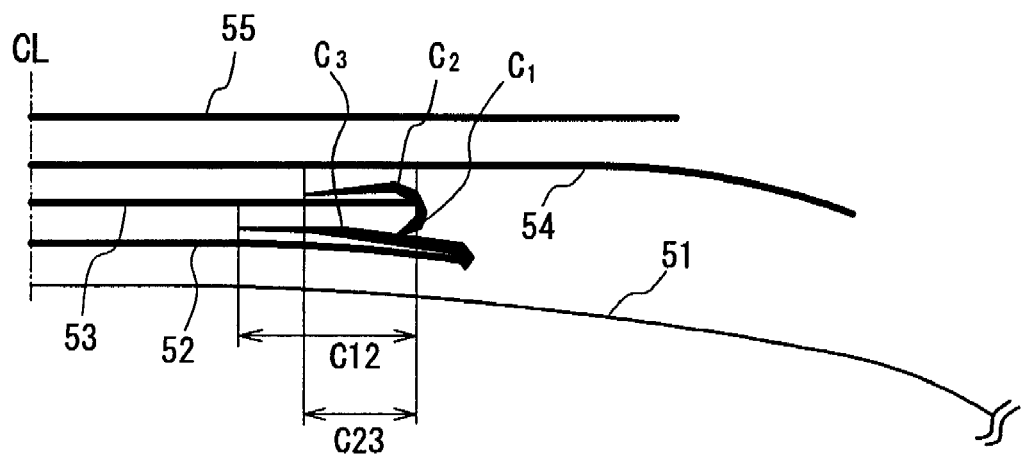
FIG. 10 is a widthwise-sectional view showing the right half of the conventional tire.
Figure 11:
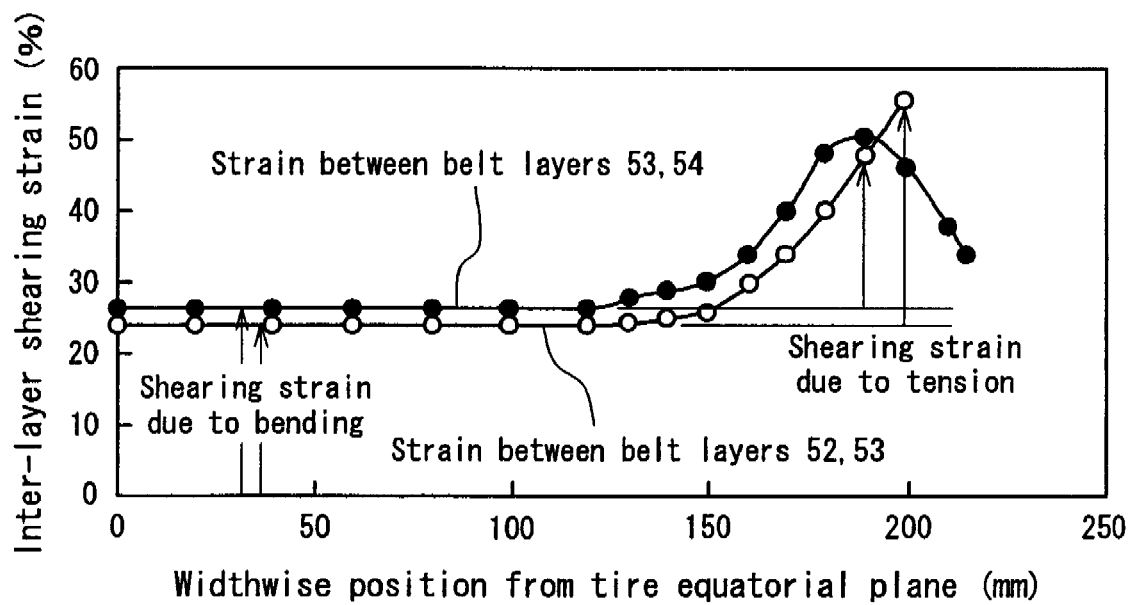
FIG. 11 is a graph showing the interlayer searing strain rate occurring in the conventional tire.

This evaluation test revealed that, for the conventional tire wherein recesses are formed in the innermost barrow belt layer 1B, and also for the example tires 1 to 4, there occurred formation of cracks $C_1$, $C_2$, $C_3$ as explained with reference to FIG. 10, from the side edges of the two narrow belt layers 1B, 2B on the inner layer side. Thus, with the side edge position of the second narrow belt layer 2B as the reference, the maximum length C12 of the cracks between the both narrow belt layers, and the maximum length C23 of the cracks between the second belt layer 2B and the third belt layer 3B were measured.

On the other hand, it has also been revealed that, due to the increase in maximum projection height C of the projections provided for the narrow belt layer 1B, formation of the interlayer cracks in the belt occurred from the tire equatorial plane X toward the side edges of the belt. Thus, the distance CC12 of the cracks between the narrow belt layers from the tire equatorial plane X, and the distance CC23 of the cracks between the second belt layer 2B and the third belt layer 3B from the tire equatorial plane X, were also measured.

It can be understood from FIG. 8 that if the maximum projection height C of the projections is within a range of $0<C<3\times d_1$, cracks growing from any direction can be effectively suppressed.

In other words, if the maximum projection height is not larger than zero, the cracks growing from the side edges of the narrow belt layers 1B, 2B become too long, while when it is not larger than $3d_1$, the cracks growing from the side of tire equatorial plane X become abruptly long.

Example 2

Figure 9:
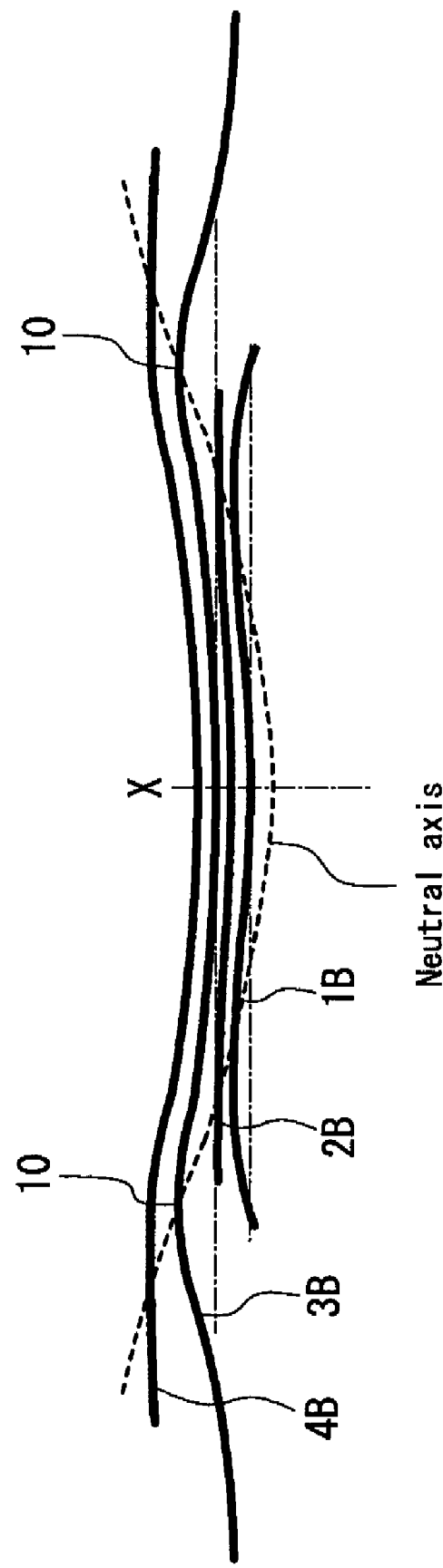
FIG. 9 is schematically shows the belt structure of the test tire as used in Example 2.

Test tires were prepared to have the same basic structure as the test tires used in Example 1, wherein the maximum projection height of the innermost narrow belt layer 1B is 3 mm (=1.2×$d_1$), and the third wide belt layer 3B is provided with projections 10 at locations corresponding to the side edges of the narrow belt layer 1B, 2B so as to be convex radially outwards, as shown FIG. 9. For these test tires, the durability of the belt was evaluated in the manner similar to Example 1. It has been revealed, as symbolically shown by circles (○) and squares (□) in the graph of FIG. 8, that C12 and C23 could be reduced to 28 mm and 30 mm, respectively, and both CC12 and CC23 could be reduced to 0 mm.

Namely, this is based on the fact that, due to the provision of the projections 10 for the wide belt layer 3B, the side portions of that belt layer 3B have increased regions that are included in the compression side, making it possible to increase the difference in elongation/contraction in the circumferential direction of the belt to thereby further reduce the shearing strain between the inner and outer layers.

The invention claimed is:

1. A heavy-duty radial tire comprising a radial carcass having a crown region, two plies of narrow belt layers on an inner layer side, and at least one ply of wide belt layer on an outer layer side, which is larger in width than said narrow belt layers, wherein said narrow belt layers and said at least one wide belt layer are sequentially arranged on an outer periphery of said crown region, said two narrow belt layers comprising belt cords intersecting a tire equatorial plane at an intersection angle, which is smaller than that of belt cords of said wide belt layers, said belt cords of the belt layers extending in directions intersecting each other between adjacent layers, said narrow belt layers including an innermost layer with side edges that are convex radially outwards, and said innermost layer having an inner peripheral surface with a radius at said side edges, said radius being not larger than a reference radius of the inner peripheral surface of the innermost layer at its intersection with said tire equatorial plane, wherein said narrow belt layers have a width that is within a range of 0.25 to 0.5 times of a tread width (TW), and the intersection angle of the belt cords relative to the tire equatorial plane is within a range of 3° to 10°.

2. A heavy-duty radial tire according to claim 1, wherein the side edges of said innermost narrow belt layer includes projections that are convex toward a radially outer side, said projections having a maximum projection height (C) defined with reference to the inner peripheral surface of said innermost layer at its intersection with said tire equatorial plane, said maximum projection height being within a range of:

$$0<C<3\times d_1$$

where $d_1$ is a diameter of the belt cords of said innermost layer.

3. A heavy-duty radial tire according to claim 1, wherein said wide belt layer has a width that is within a range of 0.60 to 0.8 times of the tread width (TW), and the intersection angle of the belt cords relative to the tire equatorial plane is within a range of 15° to 35°.

4. A heavy-duty radial tire according to claim 1, wherein an average width of said at least one wide belt layer differs from an average width of said narrow belt layers by an amount that is within a range of 0.2 to 0.4 times of the tread width (TW).

* * * * *